United States Patent [19]

Eisentraeger et al.

[11] 4,049,847
[45] Sept. 20, 1977

[54] PRODUCTION OF SELF-ADHESIVE COATINGS ON FLAT SUBSTRATES

[75] Inventors: Klaus Eisentraeger, Ludwigshafen; Güenther Immel, Weinheim; Matthias Marx, Bad Duerkheim; Hans Reinhard; Herbert Spoor, both of Limburgerhof; Gerhard Storck, Ruchheim, all of Germany

[73] Assignee: Badische Anilin- & Soda-Fabrik Aktiengesellschaft, Ludwigshafen (Rhine), Germany

[21] Appl. No.: 270,095

[22] Filed: July 10, 1972

[30] Foreign Application Priority Data

July 12, 1971 Germany .............................. 2134688

[51] Int. Cl.$^2$ .............................................. C09J 7/02
[52] U.S. Cl. ............................ 427/207 B; 427/385 B
[58] Field of Search ...... 117/122 PA, 122 P, 122 PF; 427/207, 385

[56] References Cited

U.S. PATENT DOCUMENTS

| 2,953,475 | 9/1960 | Bergstedt et al. | 117/122 X |
|---|---|---|---|
| 3,725,121 | 4/1973 | Fournier | 117/122 X |
| 3,725,122 | 4/1973 | Limburgerhof et al. | 117/122 X |
| 3,728,148 | 4/1973 | Pietsch et al. | 117/122 X |

*Primary Examiner*—Bernard D. Pienalto
*Attorney, Agent, or Firm*—Keil, Thompson & Shurtleff

[57] ABSTRACT

Self-adhesive coatings are produced on sheet materials in a simple and particularly trouble-free manner by applying to said materials mixtures of
1. acrylic ester copolymers containing polymerized units of unsaturated carboxylic acids or hydroxyl-containing vinyl monomers in addition to polymerized units of higher alkyl acrylates,
2. melamine/formaldehyde resins and, optionally,
3. solvents for components (1) and (2), and evaporating off any solvents.

10 Claims, No Drawings

PRODUCTION OF SELF-ADHESIVE COATINGS ON FLAT SUBSTRATES

Pressure-sensitive adhesives are being used in increasing amounts as coatings on labels, adhesive tapes, decorative sheeting and similar articles. The use of liquid adhesives and dry adhesive coatings requiring damping before use is being increasingly replaced by the use of pressure-sensitive adhesives.

The adhesive compositions used for these purposes must meet certain requirements. A high degree of surface tack must be accompanied by very good cohesion of the coating. The adhesive must be resistant to light, oxygen and moisture and its adhesion properties should be constant over as wide a temperature range as possible, i.e. at relatively low temperatures the tackiness should still be good, whilst at higher temperatures there should be no substantial loss of cohesion.

Rubber solutions have found a very wide range of applications as pressure-sensitive adhesives. The intrinsically non-adhesive elastomer is rendered adhesive by the addition of tackifier resins. Rubber-base compositions possess a high degree of surface tack and good bonding characteristics. However, their aging resistance is unsatisfactory, since transparent adhesive sheeting produced with such compositions yellow rapidly and their bond strength diminishes.

Pressure-sensitive adhesives comprising acrylic polymers show better resistance to aging. Such polymers are used as solutions or dispersions. A high degree of surface tack and good adhesion must also be exhibited by polyacrylates if they are to be of any value as pressure-sensitive adhesives. Such polymers possess good cohesion only when their molecular weight is relatively high.

However, in the manufacture of pressure-sensitive adhesive solutions a high molecular weight of the polymer means that virtually only solutions of low concentration can be obtained and used, which is a drawback for the following reasons: the batches of solution shipped must contain very large quantities of solvent; it is often not possible to apply the requisite amount of solid in a single operation when the concentration of the solution is low; and very large quantities of solvent have to be evaporated when pressure-sensitive adhesive coatings are produced on sheet material. Such problems hardly occur with conventional pressure-sensitive adhesives based on isocyanates. In this case relatively highly concentrated solutions of hydroxyl-containing polymers of relatively low molecular weight are mixed with solutions of polyfunctional isocyanates prior to application. This causes crosslinking or binding of the hydroxyl group-containing polymers with marked increase in molecular weight and thus in the cohesion of the adhesive. The drawback of this system is that two components are used which have only a limited pot-life when mixed, since gelling takes place rapidly. Thus a long stoppage of a coating machine can necessitate expensive cleaning operations. Moreover, isocyanates are often undesirable components of pressure-sensitive adhesives for physiological reasons, particularly when the finished product is intended to come into contact with the skin.

Finally, the molecular weight of pressure-sensitive adhesive polymers may be increased by thermal crosslinking if use is made of copolymers containing methylol groups or etherified methylol groups. In order to obtain a satisfactory rate of crosslinking at the maximum processing temperatures possible, the copolymer must contain further active groups, for example carboxyl groups, in addition to the methylol groups or etherified methylol groups.

However, the number of methylol or etherified methylol groups which can be present in the polymer in the presence of carboxyl groups is limited, since undesirable crosslinking will occur during the manufacture of the polymers if the content of methylol or etherified methylol groups is too high. Moreover, the stability on storage of pressure-sensitive adhesive solutions of polymers containing acid groups and methylol groups is limited due to the occurrence of premature crosslinking at slightly elevated temperatures.

We have now found that pressure-sensitive adhesive coatings may be advantageously produced by applying thin films of self-adhesive polyacrylates, optionally in admixture with solvents for said polyacrylates, to the surface of sheet materials and evaporating off any solvent used, provided that there are applied to said surface mixtures of A. copolymers of
   a. from 0.3 to 10% w/w of $C_{3-5}$ mono-olefinically unsaturated mono- or di-carboxylic acids or vinyl monomers containing at least 1 hydroxyl group with
   b. up to 99.7% w/w of alkyl acrylates having $C_{6-12}$ alkyl radicals,
   c. from 0 to 60% w/w of mono-olefinically unsaturated $C_{4-7}$ carboxylates and
   d. from 0 to 10% w/w of other olefinically unsaturated monomers;
B. from 0.5 to 8% by weight of the weight of the copolymer (A) of melamine/formaldehyde resins and, optionally,
C. organic solvents in which the copolymers (A) and the resin (B) are soluble, whereupon any solvent (C) used is evaporated off and the coatings, optionally during said solvent evaporation, are heated to a temperature of at least 50° C.

The copolymers (A) may be produced in conventional manner, preferably by solution polymerization of monomers (a) an (b) and, optionally, (c) and (d). Their K values are generally from 20 to 90 and preferably from 45 to 80. The olefinically unsaturated mono- or di-carboxylic acids contained as polymerized units in copolymers (A) may be for example acrylic, methacrylic, maleic, fumaric, itaconic and/or crotonic acids and acid alkyl esters of maleic, fumaric or itaconic acid, i.e. $\alpha,\beta$-olefinically unsaturated mono- and/or di-carboxylic acids containing from 3 to 5 carbon atoms or the monoalkyl esters of such dicarboxylic acids in which the alkyl radical usually contains from 1 to 4 carbon atoms. Of particular interest are acrylic, crotonic and itaconic acids. Suitable vinyl monomers containing at least one hydroxyl group are for example acrylates and methacrylates of alkane diols preferably containing from 2 to 4 carbon atoms, such as ethylene glycol acrylate, ethylene glycol methacrylate, 1,4-butanediol monoacrylate, 1,4-butanediol monomethacrylate and $\beta$-hydroxypropyl acrylate. Other suitable vinyl monomers are butene-1-diol-3,4 and vinyl thioethanol. The amount of monomers (a) is preferably from 1 to 5% by weight of the total weight of monomers. In general, only carboxyl group-containing or hydroxyl group-containing monomers (a) are used.

In the manufacture of the copolymers (A), straight-chain or branched-chain alkyl acrylates having $C_{6-12}$ alkyl groups may be used, for example n-hexyl acrylate, n-octyl acrylate, isooctyl acrylate, 2-ethylhexyl acrylate, n-decyl acrylate, and also n-dodecyl acrylate. Of particular interest are acrylates having $C_8$-alkyl radicals. The proportion of monomers (b) in copolymers (A) is usually more than 30% and preferably at least 40% by weight.

Up to 60% by weight of the monomers used in the manufacture of the copolymers (A) may be monoolefinically unsaturated $C_{4-7}$ carboxylates, for example vinyl acetate, vinyl propionate and vinyl-n-butyrate and/or methyl acrylate, methyl methacrylate, ethyl acrylate, ethyl methacrylate and n-butyl acrylate. Finally, the copolymers (A) may contain up to 10% by weight of polymerized units of other olefinically unsaturated monomers such as styrene, amides of $\alpha,\beta$-olefinically unsaturated $C_{3-5}$ mono- and/or dicarboxylic acids such as, in particular, acrylamide and methacrylamide, nitriles of $\alpha,\beta$-olefinically unsaturated carboxylic acids usually containing 3 to 4 carbon atoms such as, in particular acrylonitrile, N-vinyl lactams such as, in particular, N-vinyl pyrrolidone and/or N-vinyl caprolactam, and also olefinically unsaturated sulfonic acids such as, in particular, vinylsulfonic acid.

Suitable resins (B) are the usual melamine/formaldehyde resins preferably soluble in organic solvents. Resins (B) of this kind are described for example in Wagner-Sarx: "Lackkunstharze" 5th Edition 1971, Hanser-Verlag Munich, pp. 71 to 76, which are incorporated herein by reference, which resins are prepared by condensation of formaldehyde and melamine at a mol ratio of melamine to formaldehyde in the range of 1:3 to 1:6. Specific examples of highly suitable resins are melamine/formaldehyde resins obtained in conventional manner by reacting approximately 1 mole of melamine with about 4 moles of formaldehyde followed by etherification with lower alkanols usually containing from 1 and 6 and in particular from 2 to 4 carbon atoms, such as ethanol, n-butanol and isobutanol.

If our novel pressure-sensitive adhesive compositions are prepared using relatively low molecular weight copolymers (A) with K values ranging from 20 to 50 and in particular from 30 to 40, it is in many cases not necessary to include organic solvents (C), since such copolymers (A) are generally sufficiently free-flowing at room temperature or slightly elevated temperatures. Thus such copolymers (A) may be used in admixture with resins (B) without the addition of solvents (C) when preparing coatings according to the invention. It may be an advantage in some caes to use small amounts of solvent (C) even when such low molecular weight copolymers (A) are employed.

In the process of the invention, the copolymers (A) and resins (B) are frequently used in the form of solutions in organic solvents (C), particularly when the copolymers (A) have K values above 40, in particular from 45 to 70 or more (i.e. up to 90). Particularly suitable solvents (C) are liquid carboxylates such as ethyl acetate and n-butyl acetate, ketones such as acetone, dimethyl ketone and cyclohexanone, aromatic hydrocarbons such as benzene, toluene and the xylenes, liquid aliphatic and cycloaliphatic hydrocarbons such as petroleum fractions having boiling points of between 50° and 150° C and in particular between 60° and 100° C, cyclohexane, and ethers such as dioxane, tetrahydrofuran and di-t-butyl ethers or mixtures thereof. Particularly interesting solvents for our novel pressure-sensitive adhesive compositions are ethyl acetate, cyclohexane and mixtures of acetone with petroleum ether (b.p. 60° to 95° C).

The concentration of solvent in such solvent-containing compositions is often in the range of from about 30 to 60% and in particular from 40 to 50% by weight of solvent (C) based on the total weights of (A), (B) and (C). Such solvent-containing pressure-sensitive adhesive compositions may be prepared for example from solutions of copolymrs (A) in organic solvents (C) as obtained by solution polymerization of the monomers, said solutions being mixed with resins (B) or solutions of resins (B) in organic solvents (C) at room temperature, for example. The resulting adhesive solutions can be stored for months and remain processible over such a storage period. The adhesive compositions or solutions thereof in organic solvents (C) should not contain more than 8% by weight of resins (B), based on the weight of copolymer (A), since higher concentrations of resins (B) reduce the surface tack of the crosslinked adhesive coatings. Although solutions containing more than 8% by weight of resins (B), based on the weight of copolymer (A), are no longer generally useful as pressure-sensitive adhesives, they are nevertheless suitable for use as laminating adhesives.

In our novel process, the pressure-sensitive adhesives or solutions thereof, as defined above, are applied to the surface of sheet materials in the usual manner to form thin coatings thereon. If the coatings contain solvents (C), these are removed by evaporation in the usual manner, for example by heating to temperatures usually of from 50° to 200° C and in particular from 50 to 150° C with or without the application of reduced pressure or alternatively by applying reduced pressure with heating. If heating is carried out to temperatures of at least 50° C, a crosslinking reaction between the copolymer (A) and the resin (B) takes place. If no solvents (C) are present in the coatings on the substrates or if the solvents have been removed by evaporation under reduced pressure at temperatures below 50° C, the coating, after application or after evaporation of solvents (C), is heated to a temperature of at least 50° C and preferably at a temperature of at least 70° C, in particular from 70° to 150° C. It may in some cases be advantageous to heat to coatings to higher temperatures, for example temperatures of from 180° to 200° C. Heating of coatings, whether or not they contain solvents, may be carried out in conventional manner, e.g. by subjecting them to a blast of hot air or to the radiation of infrared heaters. In general, crosslinking of the components (A) and (B) is effected by heating for a short time, i.e. for a period of a few seconds to some minutes. When temperatures of from 50° C to about 70° C are used, it may in some cases by advantageous to carry out heating for several hours or, in rare cases, for several days. The amount of resin (B) in the adhesive compositions is preferably from 1 to 5% by weight of the weight of copolymer (A).

A particular advantage of the new process is the excellent stability of the novel adhesive compositions, which may or may not contain solvents and which are applied in the form of a single component adhesive. Thus complicated metering and mixing equipment is no longer necessary on the coating machines, and the coating machines used may be of simpler and less trouble-prone design. In particular, trouble caused by premature crosslinking and gelling of the coating compositions which might necessitate expensive cleaning operations does not occur in our present process.

Our novel process enables sheet materials to be coated with pressure-sensitive adhesive compositions, for example webs or paper and sheeting of, for example, polyethylene, polypropylene, polyvinyl chloride, polyethylene glycol terephthalate and polystyrene, which are usually provided on the reverse side with a coating of materials to which the compositions adhere poorly. Suitable sheet materials are also thin non-woven webs of mineral or textile fibers and woven or non-woven textile flooring or tiles, e.g. needle-punched materials, thick polyvinyl chloride sheets and wood or wood veneers.

In order to assess the adhesive properties of sheet materials provided with adhesive coatings by the process of the invention, sheeting of polyethylene glycol terephthalate is coated, in the examples, in such a manner that the resulting dry coating has a thickness of 25 $\mu$ (corresponding to an application rate of 25 g/m²). Any solvent used is evaporated at 20° C under reduced pressure. The adhesion values are determined after drying and after thermal crosslinking. Surface tack is assessed by the loop test and peeling test. For this purpose the sheeting coated with adhesive is cut into specimen tapes having a width of 2 cm, and these tapes are stored for 24 hours in an air-conditioned chamber at 20° C and 65% relative humidity.

In the loop test, the specimen is formed into a loop with the adhesive coating on the outside, and the tape ends are placed together in the upper jaws of a tensile testing machine (tensometer). The lower jaws of the tensometer hold a horizontal highly polished chromium plated sheet, and the loop is moved against said sheet at a rate of 150 mm/min over a length of about 5 cm and is immediately pulled off the sheet at the same rate. The force required for this pulling operation is measured.

In the peeling test, the test specimens are stuck to a chromium-plated sheet and peeled off in a direction parallel to the adhesive layer, i.e. at an angle of 180°, and the requisite force is measured. The rate of peel is 150 mm/min and the measurement is carried out immediately after and also 3 days after the specimens were stuck to the said sheet.

To measure the cohesion of a layer of adhesive, a shearing test is used. The specimens are stuck to a highly polished chromium-plated sheet having an area of 20 × 25 mm. The plate is held vertically and the end of the adhesive tape is loaded with a weight of 500 g. The time taken for the bond to break under the constant tensile stress of 500 g is measured. This measurement is carried out at 20° C and at 50° C.

In the following Examples the parts and percentages are by weight. The K values given therein were determined by the method proposed by H. Fikentscher in "Cellulose chemie", 13, pp. 58 et seq. (1932).

EXAMPLE 1

A copolymer of 97.2 parts of 2-ethylhexyl acrylate and 2.8 parts of acrylic acid is made by solution polymerization in conventional manner. The solvent used is a 3:7 v/v mixture of acetone and petroleum ether (b.p. 65° to 95° C). The K value of the polymer is 53.

The polymerization mixture has a solids content of 50% and, after cooling, 4% (based on the copolymer) of a melamine/formaldehyde resin etherified in conventional manner with n-butanol is added. The molar ratio of melamine to formaldehyde to butoxyl in the resin used is 1:4:2.

Sheets of polyethylene glycol terephthalate are coated with the solvent-containing polymer/resin mixture. The adhesion values are determined after evaporation of the solvent under reduced pressure at 20° C and also after heating for 10 minutes at 120° C. The results are as follows:

|  | Dried at 20° C in vacuo without thermal crosslinking | Dried at 20° C and heated at 120° C for 10 minutes |
| --- | --- | --- |
| Loop test | 650 g | 600 g |
| Peeling test: tested immediately | 1300 g (coh.)+ | 900 g (adh.)++ |
| tested after 3 days | 1800 g (coh.) | 1150 g (adh.) |
| Shearing test 20° C | 2 hrs. | >10 days |
| at 50° C | 12 min. | >10 days |

+The cohesion (coh.) of the adhesive film is measured.
++Adhesion value (adh.).

The thermal crosslinking causes the cohesion of the adhesive layer to rise to such an extent that adhesion values are then found.

EXAMPLE 2

A copolymer of 92 parts of 2-ethylhexyl acrylate and 8 parts of 1,4-butanediol monoacrylate is prepared in conventional manner in a solvent mixture consisting of 4 parts by volume of toluene and 6 parts by volume of petroleum ether (b.p. 65° to 95° C). The K value of the polymer is 61.

After cooling of the polymerization mixture, which contains 50% of copolymer, the etherified melamine/formaldehyde resin described in Example 1 is added in an amount of 4% based on the polymer.

Sheets of polyethylene glycol terephthalate are coated with this mixture. The adhesion values are determined after the solvent has been evaporated at 20° C under reduced pressure and also after heating for 10 minutes at 120° C. The results are as follows:

|  | Dried at 20° C in vacuo without thermal crosslinking | Dried at 20° C and heated at 120° C for 10 minutes |
| --- | --- | --- |
| Loop test | 1100 g | 700 g |
| Peeling test: tested immediately | 700 g (coh.)+ | 650 g (adh.)++ |
| tested after 3 days | 1100 g (coh.) | 750 g (adh.) |
| Shearing test at 20° C | 2 min. | >5 days |
| at 50° C | — | >5 days |

+The cohesion (coh.) of the adhesive film is measured.
++Adhesion value (adh.).

COMPARATIVE TEST 1

For comparison with Examples 1 and 2, a homopolymer of 2-ethylhexyl acrylate is prepared in conventional manner, this containing no free hydroxyl groups or carboxyl groups. The solvent used is a mixture of acetone and petroleum ether (3:7 v/v). The K value of the polymer is 53.

After cooling the polymerization mixture, which contains 50% of polymer, the etherified melamine/formaldehyde resin described in Example 1 is added in an amount of 4% based on the polymer.

Polyethylene glycol terephthalate sheets were coated with this mixture. The adhesion values were determined after evaporating the solvent and also after heating for 10 minutes at 120° C. The results are as follows:

|  | Dried at 20° C in vacuo | Dried at 20° C and heated at 120° C for 10 minutes |
|---|---|---|
| Loop test | 620 g | 600 g |
| Peeling test: |  |  |
| immediately | 380 g (coh.) | 380 g (coh.) |
| after 3 days | 400 g (coh.) | 400 g (coh.) |
| Shearing test |  |  |
| at 20° C | 2 min. | 2 min. |
| at 50° C | — | — |

In this comparative test using a polymer having no carboxyl or hydroxyl groups, no increase in cohesion is observed when heating is carried out under the said test conditions.

EXAMPLE 3

A copolymer of 70 parts of 2-ethylhexyl acrylate, 28 parts of vinyl acetate and 2 parts of acrylic acid is prepared in conventional manner in a 3:7 v/v mixture of acetone and petroleum ether. The K value of the polymer is 70.8.

To the polymer solution containing 50% of copolymer there is added 5% (based on the polymer) of an isobutanol-etherified melamine/formaldehyde resin, in which the molar ratio of melamine to formaldehyde is from 1:4 to 1:4.5.

Sheets of ethylene glycol terephthalate are coated with this mixture. The adhesion values are determined after evaporating the solvent and also after heating at 120° C for 10 minutes. The results are as follows:

|  | Dried at 20° C in vacuo | Dried at 20° C and heated at 120° C for 10 minutes |
|---|---|---|
| Loop test | 550 g | 400 g |
| Peeling test: |  |  |
| tested immediately | 450 g | 300 g |
| after 3 days | 600 g | 350 g |
| Shearing test |  |  |
| at 20° C | 2 days | >9 days |
| at 50° C | 10 hrs. | >3 days |

COMPARATIVE TEST 2

A copolymer similar to that described in Example 3 but not containing any carboxyl groups is prepared from 70 parts of 2-ethylhexyl acrylate and 30 parts of vinyl acetate. Its K value is 57.

The solvents, melamine resin and processing and testing conditions are the same as in Example 3. Test results:

|  | Dried at 20° C in vacuo | Dried at 20° C and heated at 120° C for 10 minutes |
|---|---|---|
| Loop test | 500 g | 350 g |
| Peeling test: |  |  |
| tested immediately | 410 g | 280 g |
| after 3 days | 520 g | 310 g |
| Shearing test |  |  |
| at 20° C | 16 hrs. | 6 hrs. |
| at 50° C | 4 min. | 4.5 min. |

This test also shows that the lack of carboxyl groups leads to unsatisfactory crosslinking and thus no increase in cohesion takes place under the conditions chosen.

EXAMPLE 4

A copolymer of 58 parts of 2-ethylhexyl acrylate, 40 parts of vinyl acetate and 2 parts of acrylic acid and having a K value of 58 is prepared as described in Example 3 and mixed with 5% of its weight of etherified melamine/formaldehyde resin. The mixture is tested for self-adhesive properties as above. Test results:

|  | Dried at 20° C in vacuo | Dried at 20° C and heated at 120° C for 10 minutes |
|---|---|---|
| Loop test | 350 g | 300 g |
| Peeling test: |  |  |
| tested immediately | 430 g | 410 g |
| after 3 days | 500 g (adh.) | 480 (adh.) |
| Shearing test |  |  |
| at 20° C | 6 days | 6 days |
| at 50° C | 5 hrs. | 3 days |

COMPARATIVE TEST 3

A solution copolymer of 60 parts of 2-ethylhexyl acrylate and 40 parts of vinyl acetate and having a K value of 57.5 is mixed with 5% of its weight of melamine resin as described in Example 4. The adhesive mixture is tested as described in Example 4. Test results:

|  | Dried at 20° C in vacuo | Dried at 20° C and heated at 120° C for 10 minutes |
|---|---|---|
| Loop test | 400 g | 350 g |
| Peeling test: |  |  |
| tested immediately | 310 g | 290 g |
| after 3 days | 380 g (adh.) | 360 g (adh.) |
| Shearing test | 15 hrs. | 18 hrs. |
| at 20° C | 33 min. | 14 min |

We claim:

1. A process for the production of self-adhesive coatings by applying thin films of self-adhesive polyacrylates to the surface of flat substrates which comprises applying to said surface a mixture of
   A. a copolymer of
      a. from 0.3 to 10% w/w of a $C_{3-5}$ mono-olefinically unsaturated mono- or di-carboxylic acid or a vinyl monomer containing at least one hydroxyl group with
      b. up to 99.7% w/w of an alkyl acrylate having $C_{6-12}$ alkyl groups,
      c. from 0 to 60% w/w of mono-olefinically unsaturated $C_{4-7}$ carboxylates and
      d. from 0 to 10% w/w of other olefinically unsaturated monomers;
   B. from 0.5 to 8% by weight of the weight of copolymer (A) of melamine/formaldehyde resins, the molar ratio of melamine to formaldehyde in the melamine/formaldehyde resin being from 1:3 to 1:6 and heating the coating to a temperature of at least 50° C.

2. A process as claimed in claim 1 wherein said mixture further contains an organic solvent in which said copolymer (A) and the resin (B) are soluble, and evaporating off the solvent.

3. A process as claimed in claim 1 wherein said copolymer (A) has as its component (a) a mono-olefinically unsaturated monocarboxylic acid selected from the group consisting of acrylic, methacrylic, and crotonic acid and component (b) is an alkyl acrylate selected from the group consisting of n-hexyl acrylate, n-octyl acrylate, isooctyl acrylate, 2-ethylhexyl acrylate, n-decyl acrylate, and n-dodecyl acrylate.

4. A process as claimed in claim 1 wherein said copolymer (A) has a K value of 20 to 90.

5. A process as claimed in claim 1 wherein said copolymer (A) has a K value of 45 to 80.

6. A process as claimed in claim 1 wherein said copolymer (A) has as its component (a) a mono-olefinically unsaturated carboxylic acid selected from the group consisting of maleic, fumaric, itaconic acid and an acid alkyl ester of maleic, fumaric or itaconic acid, and component (b) is an alkyl acrylate selected from the group consisting of n-hexyl acrylate, n-octyl acrylate, isooctyl acrylate, 2-ethylhexyl acrylate, n-decyl acrylate, and n-dodecyl acrylate.

7. A process as claimed in claim 1 wherein said copolymer (A) has as its component (a) a vinyl monomer with at least one hydroxyl group, said vinyl monomer being selected from the group consisting of an acrylate or methacrylate of an alkandiol having 2-4 carbon atoms, butene1-diol-3,4 and vinyl thioethanol, and component (b) is an alkyl acrylate selected from the group consisting of n-hexyl acrylate, n-octyl acrylate, isooctyln acrylate, 2-ethylhexyl acrylate, n-decyl acrylate, and n-dodecyl acrylate.

8. A process as claimed in claim 1 wherein copolymer (A) contains an amount up to 10% w/w of vinyl acetate, vinyl propionate, vinyl-n-butyrate, methyl acrylate, methyl methacrylate, ethyl acrylate, ethyl methacrylate or n-butyl acrylate.

9. A process as claimed in claim 8 wherein copolymer (A) contains an amount up to 10% w/w of acrylamide, methacrylamide, acrylonitrile, N-vinylpyrrolidone, N-vinyl caprolactam or vinylsulfonic acid.

10. A process as claimed in claim 1 wherein copolymer (A) contains an amount up to 10% w/w of acrylamide, methacrylamide, acrylonitrile, N-vinylpyrrolidone, N-vinylcarprolactam or vinylsulfonic acid.

* * * * *

UNITED STATES PATENT AND TRADEMARK OFFICE
CERTIFICATE OF CORRECTION

PATENT NO. : 4,049,847
DATED : September 20, 1977
INVENTOR(S) : EISENTRAGER ET AL It is certified that error appears in the above-identified patent and that said Letters Patent are hereby corrected as shown below:

Column 10 line 5-6 "isooctyln" should read --isooctyl--
Column 10 line 17, "vinyl caprolactam" should read --vinylcaprolactam--

Signed and Sealed this

Eighteenth Day of April 1978

[SEAL]

Attest:

RUTH C. MASON
Attesting Officer

LUTRELLE F. PARKER
Acting Commissioner of Patents and Trademarks